(12) United States Patent
Kita et al.

(10) Patent No.: US 11,885,677 B2
(45) Date of Patent: Jan. 30, 2024

(54) HIGH-PERFORMANCE ON-CHIP SPECTROMETERS AND SPECTRUM ANALYZERS

(71) Applicant: Massachusetts Institute of Technology, Cambridge, MA (US)

(72) Inventors: Derek Kita, Cambridge, MA (US); Carlos Andres Rios Ocampo, Cambridge, MA (US); Juejun Hu, Newton, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 278 days.

(21) Appl. No.: 17/227,440

(22) Filed: Apr. 12, 2021

(65) Prior Publication Data

US 2021/0239526 A1    Aug. 5, 2021

Related U.S. Application Data

(63) Continuation of application No. 16/710,621, filed on Dec. 11, 2019, now Pat. No. 10,983,003.

(60) Provisional application No. 62/803,993, filed on Feb. 11, 2019.

(51) Int. Cl.
| | | |
|---|---|---|
| G01J 3/02 | (2006.01) | |
| G01J 3/45 | (2006.01) | |
| G01J 3/453 | (2006.01) | |
| G02F 1/21 | (2006.01) | |

(52) U.S. Cl.
CPC .......... *G01J 3/0256* (2013.01); *G01J 3/0205* (2013.01); *G01J 3/0213* (2013.01); *G01J 3/45* (2013.01); *G01J 3/4531* (2013.01); *G01J 3/4532* (2013.01); *G02F 1/212* (2021.01)

(58) Field of Classification Search
CPC ...... G01J 3/0256; G01J 3/0205; G01J 3/0213; G01J 3/45; G01J 3/4531; G01J 3/4532; G02F 1/212
See application file for complete search history.

(56) References Cited

U.S. PATENT DOCUMENTS

| | | |
|---|---|---|
| D262,419 S | 12/1981 | Cramer |
| 4,749,248 A | 6/1988 | Aberson, Jr. et al. |
| 4,969,742 A | 11/1990 | Falk et al. |
| 5,044,715 A | 9/1991 | Kawachi et al. |

(Continued)

FOREIGN PATENT DOCUMENTS

| | | |
|---|---|---|
| WO | 2012097982 A1 | 7/2012 |
| WO | 2013188520 A2 | 12/2013 |
| WO | 2014190331 A3 | 3/2015 |

OTHER PUBLICATIONS

"Optical channel monitor based on planar lightwave circuit technology," Enablence, Ottawa, ON, Canada, Tech. Rep., (2010): 1-4.

(Continued)

*Primary Examiner* — Dominic J Bologna
(74) *Attorney, Agent, or Firm* — Smith Baluch LLP (57) ABSTRACT

We disclose an on-chip photonic spectroscopy system capable of dramatically improving the signal-to-noise ratio (SNR), dynamic range, and reconstruction quality of Fourier transform spectrometers. Secondly, we disclose a system of components that makes up a complete on-chip RF spectrum analyzer with low-cost and high-performance.

18 Claims, 7 Drawing Sheets

(56) References Cited

U.S. PATENT DOCUMENTS

| | | | |
|---|---|---|---|
| 5,546,181 A | 8/1996 | Kobayashi et al. | |
| 5,623,360 A * | 4/1997 | Gesell | H01Q 3/2676 356/450 |
| 5,644,125 A | 7/1997 | Wobschall | |
| 5,751,415 A | 5/1998 | Smith et al. | |
| 5,814,565 A | 9/1998 | Reichert et al. | |
| 6,108,478 A | 8/2000 | Harpin et al. | |
| 6,205,279 B1 | 3/2001 | Kim et al. | |
| 6,370,422 B1 | 4/2002 | Richards-Kortum et al. | |
| 6,925,220 B2 | 8/2005 | Mukai | |
| 6,947,631 B2 | 9/2005 | Arai et al. | |
| 6,963,062 B2 | 11/2005 | Cyr et al. | |
| 6,975,781 B2 | 12/2005 | Takiguchi et al. | |
| 7,151,599 B2 | 12/2006 | Islam et al. | |
| 7,251,406 B2 | 7/2007 | Luo et al. | |
| 7,301,624 B2 | 11/2007 | Talley et al. | |
| 7,359,593 B2 | 4/2008 | Little | |
| 7,361,501 B2 | 4/2008 | Koo et al. | |
| 7,400,798 B2 | 7/2008 | De Almeida et al. | |
| 7,547,904 B2 | 6/2009 | Schmidt et al. | |
| 7,636,157 B2 | 12/2009 | Wang et al. | |
| 7,864,321 B2 | 1/2011 | Caron et al. | |
| 8,098,379 B2 | 1/2012 | Okamoto | |
| 8,116,602 B2 | 2/2012 | Little et al. | |
| 8,121,450 B2 | 2/2012 | Webster et al. | |
| 8,297,128 B2 | 10/2012 | Delbos et al. | |
| D677,185 S | 3/2013 | Zhou et al. | |
| 8,406,580 B2 | 3/2013 | Takada et al. | |
| 8,545,759 B2 | 10/2013 | Niazi | |
| 8,615,324 B2 | 12/2013 | West | |
| 8,640,560 B2 | 2/2014 | Burke | |
| 8,718,981 B2 | 5/2014 | Bey et al. | |
| 8,809,765 B2 | 8/2014 | Weisshaar et al. | |
| 8,971,672 B2 | 3/2015 | Diemeer et al. | |
| D748,510 S | 2/2016 | Zhou et al. | |
| 9,529,158 B2 | 12/2016 | Sorger et al. | |
| 9,618,699 B2 | 4/2017 | Tummidi et al. | |
| 9,816,935 B2 | 11/2017 | Peumans et al. | |
| 10,006,809 B2 | 6/2018 | Hu et al. | |
| 10,054,546 B2 | 6/2018 | Stievater et al. | |
| 10,240,980 B2 | 3/2019 | Hu et al. | |
| 10,386,237 B2 | 8/2019 | Hu et al. | |
| 10,571,335 B2 | 2/2020 | Hu et al. | |
| 10,610,087 B2 | 4/2020 | Hu et al. | |
| 10,718,668 B2 | 7/2020 | Gu et al. | |
| 10,852,190 B2 | 12/2020 | Hu et al. | |
| 10,983,003 B2 | 4/2021 | Kita et al. | |
| 2002/0159684 A1 | 10/2002 | Sun et al. | |
| 2003/0048991 A1 | 3/2003 | Gonthier | |
| 2003/0156786 A1 | 8/2003 | Pan | |
| 2004/0001671 A1 | 1/2004 | Liu et al. | |
| 2004/0131310 A1 | 7/2004 | Walker | |
| 2004/0145741 A1 | 7/2004 | Cole et al. | |
| 2004/0150830 A1 | 8/2004 | Chan | |
| 2004/0151436 A1 | 8/2004 | Chan | |
| 2005/0082480 A1 | 4/2005 | Wagner et al. | |
| 2005/0100260 A1 * | 5/2005 | Yamazaki | G02F 1/225 385/5 |
| 2005/0123244 A1 | 6/2005 | Block et al. | |
| 2005/0248758 A1 | 11/2005 | Carron et al. | |
| 2005/0248759 A1 | 11/2005 | Wang et al. | |
| 2006/0159411 A1 | 7/2006 | Miller | |
| 2006/0166302 A1 | 7/2006 | Clarke et al. | |
| 2006/0170931 A1 | 8/2006 | Guo et al. | |
| 2006/0233504 A1 | 10/2006 | Hochberg et al. | |
| 2006/0251371 A1 | 11/2006 | Schmidt et al. | |
| 2007/0013908 A1 | 1/2007 | Lee et al. | |
| 2007/0041729 A1 | 2/2007 | Heinz et al. | |
| 2007/0076208 A1 | 4/2007 | Koo | |
| 2007/0077595 A1 | 4/2007 | Koo et al. | |
| 2007/0237457 A1 | 10/2007 | Davis et al. | |
| 2008/0144001 A1 | 6/2008 | Heeg et al. | |
| 2008/0144672 A1 | 6/2008 | Cohen et al. | |
| 2009/0219525 A1 | 9/2009 | Marcus et al. | |
| 2010/0017159 A1 | 1/2010 | Burke | |
| 2010/0039644 A1 | 2/2010 | Choi et al. | |
| 2010/0130870 A1 | 5/2010 | Kopriva | |
| 2010/0290042 A1 | 11/2010 | Vakhshoori et al. | |
| 2011/0080580 A1 * | 4/2011 | Fermann | G01N 21/65 372/18 |
| 2011/0116741 A1 | 5/2011 | Cevini et al. | |
| 2011/0125078 A1 | 5/2011 | Denison et al. | |
| 2011/0189050 A1 | 8/2011 | Schlereth et al. | |
| 2012/0105843 A1 | 5/2012 | Hirai et al. | |
| 2012/0215073 A1 | 8/2012 | Sherman et al. | |
| 2012/0242993 A1 | 9/2012 | Schick et al. | |
| 2013/0046357 A1 | 2/2013 | Neev | |
| 2013/0071850 A1 | 3/2013 | Duer | |
| 2013/0259747 A1 | 10/2013 | Lee et al. | |
| 2013/0321816 A1 | 12/2013 | Dattner et al. | |
| 2013/0328866 A1 | 12/2013 | Woodgate et al. | |
| 2014/0092385 A1 | 4/2014 | Nitkowski et al. | |
| 2014/0098371 A1 | 4/2014 | Sabry et al. | |
| 2014/0375999 A1 | 12/2014 | Okamoto | |
| 2015/0010994 A1 | 1/2015 | Rao et al. | |
| 2015/0116721 A1 | 4/2015 | Kats et al. | |
| 2015/0146203 A1 | 5/2015 | Lai et al. | |
| 2016/0109294 A1 | 4/2016 | Kasper et al. | |
| 2016/0157706 A1 | 6/2016 | Pisanello et al. | |
| 2016/0258876 A1 | 9/2016 | Hosani et al. | |
| 2016/0305797 A1 | 10/2016 | Pietrasik et al. | |
| 2017/0108439 A1 | 4/2017 | Stievater et al. | |
| 2017/0227399 A1 * | 8/2017 | Hu | G02F 1/3136 |
| 2018/0011249 A1 | 1/2018 | Zhu et al. | |
| 2018/0080824 A1 | 3/2018 | Lucey | |
| 2018/0106671 A1 | 4/2018 | Claes | |
| 2018/0140172 A1 | 5/2018 | Hu et al. | |
| 2018/0274981 A1 | 9/2018 | Hu et al. | |
| 2019/0049300 A1 | 2/2019 | Gu et al. | |
| 2019/0285473 A1 | 9/2019 | Hu et al. | |
| 2019/0331529 A1 | 10/2019 | Hu et al. | |
| 2020/0003619 A1 | 1/2020 | Hu et al. | |
| 2020/0256728 A1 | 8/2020 | Kita et al. | |

OTHER PUBLICATIONS

Abaya, T. V. F. et al., "Characterization of a 3D optrode array for infrared neural stimulation," Biomedical Optics Express, 3(9): 2200-2219 (2012).

Aggarwal, "What's fueling the biotech engine—2010 to 2011." Nature biotechnology 29.12 (2011): 1083. 7 pages.

Akca et al., "Miniature spectrometer and beam splitter for an optical coherence tomography on a silicon chip," Optics Express, vol. 21, No. 14, (2013): 16648-16656.

Ako et al., "Electrically tuneable lateral leakage loss in liquid crystal clad shallow-etched silicon waveguides," Optics Express, vol. 23, No. 3, (2015): 2846-2856.

Babin et al., "Digital optical spectrometer-on-chip," Applied Physics Letters, vol. 95, No. 4, (2009): 1-4.

Bao et al., "A colloidal quantum dot spectrometer," Nature, vol. 523, (2015): 67-70.

Bauters et al., "Planar waveguides with less than 0.1 dB/m propagation loss fabricated with wafer bonding," Optics Express, vol. 19, No. 24, (2011): 24090-24101.

Birch et al., "An Updated Edlen Equation for the Refractive Index of Air," Metrologia, vol. 30, (1993): 155-162.

Birks et al. "The Photonic Lantern," Advances in Optics and Photonics, vol. 7, No. 2, (2015): 107-167.

Bock et al., "Subwavelength grating periodic structures in silicon-on-insulator: a new type of microphotonic waveguide." Optics express 18.19 (2010): 20251-20262.

Bogaerts et al., "Silicon-on-Insulator Spectral Filters Fabricated With CMOS Technology," IEEE Journal of Selected Topics in Quantum Electron, vol. 16, No. 1, (2010): 33-44.

Bogaerts et al., Silicon microring resonators. Laser & Photon. Rev. 2012, 6: 47-73. doi:10.1002/lpor.201100017.

Brouckaert et al., Planar Concave Grating Demultiplexer on a Nanophotonic Silicon-on-Insulator Platform, LEOS 2006—19th Annual Meeting of the IEEE Lasers and Electro-Optics Society, Montreal, Que., 2006, pp. 312-313. doi: 10.1109/LEOS.2006. 279091.

(56) References Cited

OTHER PUBLICATIONS

Carmon et al., "Dynamics: thermal behavior and thermal self-stability of microcavities," Optics Express, vol. 12, No. 20, (2004): 654-656.
Chao et al., "Compact Liquid Crystal Waveguide Based Fourier Transform Spectrometer for In-Situ and Remote Gas and Chemical Sensing," Proc. of SPIE, vol. 6977, (2008): 1-11.
Cheben et al. "A high-resolution silicon-on-insulator arrayed waveguide grating microspectrometer with sub-micrometer aperture waveguides," Optics Express, vol. 15, No. 5, (2007): 2299-2306.
Chen et al., "Heterogeneously Integrated Silicon Photonics for the Mid-Infrared and Spectroscoping Sensing," ACS Nano, vol. 8, No. 7, (2014): 6955-6961.
Civitoi et al., "Planar Prism Spectrometer based on Adiabatically Connected Waveguiding Slabs," Optics Communications, vol. 365, (2016): 29-37.
Coarer et al., "Wavelength-scale stationary-wave integrated Fourier transform spectrometry," Nature Photonics, vol. 1, No. 8, (2007): 473-478.
Dalir, H. et al., "Spatial mode multiplexer/demultiplexer based on tapered hollow waveguide," IEICE Electronics Express, 8(9): 684-688 (2011).
DeCorby et al., "Chip-scale spectrometry based on tapered hollow Bragg waveguides," Optics Express, vol. 17, No. 19, (2009): 16632-16645.
Deutsch et al., "High-resolution miniature FTIR spectrometer enabled by a large linear travel MEMS pop-up mirror," Proc. of SPIE, vol. 7319, (2009): 1-8.
DEWaN "Process Analytical Technologies for Pharmaceuticals: Global Markets," 2018. 263 pages.
Dewan, "Single Use Technology for Biopharmaceuticals: Global Markets," 2017. 163 pages.
Dhakal et al., "Nanophotonic waveguide enhanced Raman spectroscopy of biological submonolayers." ACS Photonics 3.11 (2016): 2141-2149.
Dhakal et al., Nanophotonic Waveguide Enhanced Raman Spectroscopy of Biological Submonolayers. ACS Photonics 2016, 3, 11, 2141-2149.
Ding, Y. et al., "On-chip two-mode division multiplexing using tapered directional coupler-based mode multiplexer and demultiplexer," Optics Express, 21(8): 10376-10382 (2013).
Dong et al., "Nano-Silicon-Photonic Fourier Transform Infrared (FTIR) Spectrometer-on-aChip," Optical Society of America, vol. 1, (2015): 3-4.
Dorrer et al., "RF spectrum analysis of optical signals using nonlinear optics." Journal of lightwave technology 22.1 (2004): 266. 9 pages.
Du et al., "Low-loss photonic device in Ge—Sb—S chalcogenide glass," Optics Letters, vol. 41, No. 13, (2016): 3090-3093.
Dumais et al., "2×2 Multimode Interference Coupler with Low Loss Using 248 nm Photolithography," Optical Society of America, (2016): 19-21.
Evans et al., "TiO2 nanophotonic sensors for efficient integrated evanescent Raman spectroscopy." ACS Photonics 3.9 (2016): 1662-1669.
Fisher, "Going with the flow: continuous manufacturing," Pharmaceutical Technology, Jan. 22, 2012. 24 pages.
Florjanczyk et al., "Multiaperture planar waveguide spectrometer formed by arrayed Mach-Zehnder interferometers," Optics Express, vol. 15 No. 26, (2007): 18176-18189.
Food and Drug Administration, and Process Analytical Technology Initiative. "Guidance for industry PAT-A Framework for Innovative Pharmaceutical development." Manufacturing and Quality Assurance (2004). 19 pages.
Gan et al., "A high-resolution spectrometer based on a compact planar two dimensional photonic crystal cavity array," Applied Physics Letters, vol. 100, No. 23, (2012): 1-4.
Gehm et al., "Static two-dimensional aperture coding for multimodal, multiplex spectroscopy," Applied Optics, vol. 45, No. 13, (2006): 2965-2974.
Guideline, ICH Harmonised Tripartite. "Pharmaceutical development." Q8. Current Step 4 (2009). 11 pages.
Harris et al., "Efficient, compact and low loss thermo-optic phase shifter in silicon," Optics Express, vol. 22, No. 9, (2014): 83-85.
Herres et al.,"Understanding FT-IR Data Processing," Part 1: Data Acquistion and Fourier Transformation (1984): 352-356.
Herriott et al., "Folded Optical Delay Lines," Applied Optics, vol. 4, No. 8, (1965): 883-889.
Holmstrom et al., "Trace gas Raman spectroscopy using functionalized waveguides." Optica 3.8 (2016): 891-896.
Hu et al., "Cavity-Enhanced Infrared Absorption in Planar Chalcogenide Glass Microdisk Resonators: Experiment and Analysis," Journal of Lightwave Technology, vol. 27, No. 23 (2009): 5240-5245.
Hu et al., Angled multimode interferometer for bidirectional wavelength division (de)multiplexing. R Soc Open Sci. Oct. 21, 2015;2(10):150270. doi: 10.1098/rsos.150270. eCollection Oct. 2015.
Hu, "Ultra-sensitive chemical vapor detection using microcavity photothermal spectroscopy," Optics Express, vol. 18, No. 21, (2010): 22174-22186.
Hung et al., Narrowband Reflection From Weakly Coupled Cladding-Modulated Bragg Gratings, in IEEE Journal of Selected Topics in Quantum Electronics, vol. 22, No. 6, pp. 218-224, Nov.-Dec. 2016, Art No. 4402507. doi: 10.1109/JSTQE.2015.2487878.
International Preliminary Report on Patentability for International Application No. PCT/US15/062509, dated Jun. 8, 2017, 9 pages.
International Search Report and Written Opinion dated Jun. 9, 2017 from International Application No. PCT/US17/17349, 30 pages.
International Search Report and Written Opinion in International Patent Application No. PCT/US2019/039689 dated Oct. 31, 2019, 17 pages.
International Search Report and Written Opinion in International Patent Application No. PCT/US2019/065689 dated Feb. 27, 2020, 10 pages.
International Search Report and Written Opinion in PCT/US2018/045859 dated Nov. 2, 2018, 14 pages.
International Search Report and Written Opinion issued by the International Searching Authority for International Application No. PCT/US15/062509, dated Feb. 1, 2017, 10 pages.
International Search Report and Written Opinion dated Oct. 6, 2016 for International Application No. PCT/US16/43488, 17 pages.
Jiang et al., "Wavelength and bandwidth-tunable silicon comb filter based on Sagnac loop mirrors with Mach-Zehnder interferometer couplers," Optics Express, vol. 24, No. 3, (2018): 2183-2188.
Kita et al., "High-performance and scalable on-chip digital Fourier transform spectroscopy." Nature communications 9.1 (2018): 4405. 7 pages.
Kita et al., "On-Chip Infrared Spectroscopic Sensing: Redefining the Benefits of Scaling," in IEEE Journal of Selected Topics in Quantum Electronics, vol. 23, No. 2, pp. 340-349, Mar.-Apr. 2017, Art No. 5900110. doi: 10.1109/JSTQE.2016.2609142.
Klutz et al., "Developing the biofacility of the future based on continuous processing and single-uses technology." Journal of biotechnology 213 (2015): 120-130.
Koonen, A. M. J. et al., "Silicon Photonic Integrated Mode Multiplexer and Demultiplexer," IEEE Photonics Technology Letters, 24(21): 1961-1964 (2012).
Kraft et al., "MEMS-based Compact FT-Spectrometers—A Platform for Spectroscopic Mid-Infrared Sensors," Sensors (2008): 1-4.
Kuczewski et al., "A single-use purification process for the production of a monoclonal antibody produced in a PER. C6 human cell line." Biotechnology journal 6.1 (2011): 56-65.
Kyotoku et al.,"Sub-nm resolution cavity enhanced microspectrometer." Optics Express, vol. 18, No. 1, (2010): 102-107.
Lee et al., "In situ bioprocess monitoring of *Escherichia coli* bioreactions using Raman spectroscopy." Vibrational Spectroscopy 35.1-2 (2004): 131-137.
Lee et al., "Modernizing pharmaceutical manufacturing: from batch to continuous production." Journal of Pharmaceutical innovation 10.3 (2015): 191-199.
Lee, "Modernizing the Way Drugs Are Made: A Transition to Continuous Manufacturing," Retrieved from FDA: https://www.fda.gov/Drugs/NewsEvents/ucm557448.htm (2017). 3 pages.

(56) References Cited

OTHER PUBLICATIONS

Lee, C.-K. et al., "Light field acquisition using wedge-shaped waveguide," 2013 IEEE International Conference on Consumer Electronics (ICCE), pp. 228-229.

Levine et al., "Efficient, flexible facilities for the 21st century." BioProcess Int 10.11 (2012): 20-30.

Lin et al., "Double resonance 1-D photonic crystal cavities for single-molecule mid-infrared photothermal spectroscopy: theory and design," Optics Letter, vol. 37, No. 8, (2012): 1304-1306.

Ma et al., "CMOS-Compatible Integrated Spectrometer Based on Echelle Diffraction Grating and MSM Photodetector Array." Photonics Journal, vol. 5, No. 2, (2013): 6600807-6600807.

Martens et al., "Compact Silicon Nitride Arrayed Waveguide Gratings for Very Near-Infrared Wavelengths," in IEEE Photonics Technology Letters, vol. 27, No. 2, pp. 137-140, 15 Jan. 15, 2015. doi: 10.1109/LPT.2014.2363298.

Miller, "Perfect optics with imperfect components." Optica 2.8 (2015): 747-750.

Momeni et al., "Integrated photonic crystal spectrometers for sensing applications," Optics Communications, vol. 282, No. 15, (2009): 3168-3171.

Nedeljkovic et al., "Mid-Infrared Silicon-on-Insulator Fourier-Transform Spectrometer Chip," IEEE Photonics Technology Letters, vol. 28, No. 4, (2016): 528-531.

Nitkowski et al., "Cavity-enhanced on on-chip absorption spectroscopy using microring resonators," Optics Express, vol. 16, No. 16, (2008): 11930-11936.

Nitkowski et al., "On-chip spectrophotometry for bioanalysis using microring resonators," Biomedical Optics Express, vol. 2, No. 2, (2011): 271-277.

Overton, "How spectrometers have shrunk and grown since 2010," Laser Focus World, vol. 52, No. 2, (2016): 35-41.

Pathak et al., "Comparison of AWGs and Echelle Gratings for Wavelength Division Multiplexing on Silicon-on-Insulator," in IEEE Photonics Journal, vol. 6, No. 5, pp. 1-9, Oct. 2014, Art No. 4900109. doi: 10.1109/JPHOT.2014.2361658.

Petit et al., "Compositional dependence of the nonlinear refractive index of new germanium-based chalcogenide glasses," Journal of Solid State Chemistry, vol. 182, No. 10, (2009): 2756-2761.

Pisanello, F. et al., "Multipoint-Emitting Optical Fibers for Spatially Addressable In Vivo Optogenetics," Neuron, 82(6): 1245-1254 (2014).

Redding et al., "All-fiber spectrometer based on speckle pattern reconstruction," Optics Express, vol. 21, No. 5, (2013): 6584-6600.

Redding et al., "Compact spectrometer based on a disordered photonic chip," Nature Photonics, vol. 7, No. 9, (2013): 746-751.

Redding et al., "Using a multimode fiber as a high-resolution, low-loss spectrometer," Optics Letters, vol. 37, No. 16. (2012): 3384-3386.

Reyes et al., "A novel method of creating a surface micromachined 3D optical assembly for MEMS-based miniaturized FTIR spectrometers," Proc. of SPIE, vol. 6888, (2008): 1-8.

Robinson et al., "First-principle derivation of gain in high-index-contrast waveguides," Optics Express, vol. 16, No. 21, (2008): 16659-16669.

Roeikens et al., "Silicon-based heterogeneous photonic integrated circuits for the mid-infrared," Optical Materials Express, vol. 3, No. 9, (2013): 1523-1536.

Saar et al., "Coherent Raman scanning fiber endoscopy," Optics Letters, vol. 36, No. 13, dated Jul. 1, 2011, 3 pages.

Schuler et al., "MEMS-based microspectrometer technologies for NIR and MIR wavelengths," Journal of Physics D: Applied Physics, vol. 42, No. 13, (2009): 1-13.

Sellar et al., "Comparison of relative signal-to-noise ratios of different classes of imaging spectrometer," Applied Optics, vol. 44, No. 9, (2005): 1614-1624.

Sharpe et al., "Gas-phase databases for quantitative infrared spectroscopy," Applied Spectroscopy, vol. 58, No. 12, (2004): 1452-1461.

Shiryaev et al., "Preparation of optical fibers based on Ge—Sb—S glass system," Optical Materials, vol. 32, No. 2, (2009): 362-367.

Singh et al., "Raman spectroscopy of complex defined media: biopharmaceutical applications." Journal of Raman Spectroscopy 46.6 (2015): 545-550.

Singh et al., "Mid-infrared materials and devices on a Si platform for optical sensing," Science and Technology of Advanced Materials, vol. 15, No. 1, (2014): 1-15.

Smith et al., "Sensing nitrous oxide with QCL-coupled siliconon-sapphire ring resonators," Optics Express, vol. 23, No. 5, (2015): 5491-5499.

Soole et al., "Monolithic InP/InGaAsP/InP grating spectrometer for the 1.48-1.56µm wavelength range," Applied Physics Letters, vol. 58, No. 18, (1991): 1949-1951.

Stark, E. et al., "Diode probes for spatiotemporal optical control of multiple neurons in freely moving animals," J Neurophysiol, 108(1): 349-363 (2012).

Stevens et al., Developing fibre optic Raman probes for applications in clinical spectroscopy. Chem Soc Rev. Apr. 7, 2016;45(7):1919-34. doi: 10.1039/c5cs00850f. Epub Mar. 9, 2016. Review. PubMed PMID: 26956027.

Subramanian et al., "Silicon and silicon nitride photonic circuits for spectroscopic sensing on-a-chip." Photonics Research 3.5 (2015): B47-B59.

Subramanian et al., "Silicon and silicon nitride photonic circuits for spectroscopic sensing on-a-chip," Photon. Res., vol. 3, No. 5, (2015): 47-59.

Szymanski, Raman spectroscopy: theory and practice. Springer Science & Business Media, 2012.

Tamazin et al., "Ultra-broadband Compact Adiabatic Coupler in Silicon-on-Insulator for Joint Operation in the C-and O-Bands." CLEO: Science and Innovations. Optical Society of America, 2018. 2 pages.

Travis, A. et al., "Collimated light from a waveguide for a display backlight," Optics Express, 17(22): 19714-19719 (2009).

Travis, A. R. L. et al., "Wedge Optics in Flat Panel Displays," Proceedings of the IEEE, 101(1): 45-60 (2013).

Wan et al., "High-resolution optical spectroscopy using multimode interference in a compact tapered fibre," Nature Commmunications, vol. 6, (2015): 1-6.

Wang et al., "Polarization-Independent Mode-Evolution-Based Coupler for the Silicon-on-Insulator Platform." IEEE Photonics Journal 10.3 (2018): 1-10.

Wen et al., "All-optical switching of a single resonance in silicon ring resenators," Optics Letters, vol. 36, No. 8, (2011): 1413-1415.

Wilkes et al., "60 dB high-extinction auto-configured Mach-Zehnder interferometer." Optics letters 41.22 (2016): 5318-5321.

Wilkins, "Disposable bioreactor sensors play catch-up." Bioprocess Int, Westborough 56 (2011). 4 pages.

Xia et al., "High resolution on-chip spectroscopy based onminiaturized microdonut resonators," Optics Express, vol. 19, No. 13, (2011): 12356-12364.

Xu et al., "High speed silicon Mach-Zehnder modulator based on interleaved PN junctions," Optical Express, vol. 20, No. 14, (2012): 15093-15099.

Xu et al., "Multimodalmultiplex spectroscopy using photonic crystals," Optical Express, vol. 11, No. 18, (2003): 2126-2133.

Yu, "Continuous manufacturing has a strong impact on drug quality." FDA Voice 12, Apr. 13, 2016. 5 pages.

Zhang et al., "A compact and low loss Y-junction for submicron silicon waveguide," Optical Express, vol. 21, No. 1, (2013): 1310-1316.

\* cited by examiner

*FIG. 2B* Without arm-loss balancing

*FIG. 2C* With arm-loss balancing

FIG. 3A  FIG. 3B

Integrated Si Photonic components for broadband operation

FIG. 4A

Edge coupling (grating coupling)

FIG. 4B

Adiabatic coupler (Y-branch)

Switch:
$$\Delta\varphi = \frac{2\pi}{\lambda}\Delta n(T)L$$

$\Delta\varphi = 0$
$\Delta\varphi = \pi$

FIG. 4C

FIG. 4D $\Delta\phi = 0$
$\Delta\phi = \pi$

FIG. 4E

Adiabatic coupler (directional coupler)

HIGH-PERFORMANCE ON-CHIP SPECTROMETERS AND SPECTRUM ANALYZERS

CROSS-REFERENCE TO RELATED APPLICATIONS

This application is a continuation of U.S. application Ser. No. 16/710,621, which was filed on Dec. 11, 2019 and which claims the priority benefit, under 35 U.S.C. 119(e), of U.S. Application No. 62/803,993, which was filed on Feb. 11, 2019. Each of these applications is incorporated herein by reference in its entirety for all purposes.

GOVERNMENT SUPPORT

This invention was made with government support under ECCS1709212 awarded by the National Science Foundation. The government has certain rights in this invention.

BACKGROUND

An optical spectrometer or spectrum analyzer is a device that measures the intensity of an input signal as a function of frequency. Optical spectrometers are widely used for the spectroscopic analysis of materials. They can also be used for a large number of other applications in industries such as pharmaceuticals, biotechnology, telecommunications, defense, and research and development. Traditional spectrometers are free-space benchtop equipment that occupy a large volume, are fragile (sensitive to movements and vibrations), and are expensive (on the order of >$50,000 per unit).

Using integrated photonics, it is possible to fabricate all of the optical components for spectrum analysis on a single silicon substrate with high yield, through-put, and quality. However, prior methods of performing spectroscopy on-chip (such as spectroscopy with dispersive arrayed-waveguide gratings or Echelle gratings) use a large number of photodetectors, are sensitive to temperature and fabrication, and are practically limited to a small channel count. Existing on-chip interferometric techniques are also dramatically limited in-terms of the accessible spectral resolution and/or channel count.

SUMMARY

U.S. Pat. No. 10,006,809, which is incorporated herein by reference in its entirety, discloses our digital Fourier transform (dFT) on-chip spectroscopy. Our dFT spectroscopy techniques offer fine spectral resolution, high spectral channel counts, and a high degree of reliability in a compact, chip-scale spectrometer. A dFT spectrometer includes an interferometer with two interference arms that produce interference patterns from incident light. At least one of the interference arms includes a series of cascaded optical switches connected by two (or more) waveguides of different lengths. Each optical switch directs the incident light into one waveguide or another, thereby changing the optical path length difference between the first interference arm and the second interference arm.

Here, we disclose several distinct modifications that make our dFT technology more attractive for consumer applications and enables use of our dFT technology for chemical/biological sensing and radio-frequency (RF) spectrum analysis. These modifications include:

(1) shifting the interferometer spectrum with in-line phase modulators in each interferometer arm such that a single narrow band of light can be efficiently filtered (which enables applications in Fourier transform Raman (FT-Raman) spectroscopy and RF spectrum analysis);

(2) balancing the losses between the two arms of the interferometer with a final stage of phase modulators, thereby enhancing the interferometer's extinction ratio and dynamic range and increasing the power received by the photodetectors by up to 3 dB;

(3) intermediate or partial optical switching to increase the spectral channel count;

(4) monitoring the switching efficiency of each optical switch in the spectrometer;

(5) increasing the operational bandwidth of the spectrometer with perfect switching with imperfect components; and (6) controlling and tuning the phase modulators in the dFT spectrometer.

These modifications dramatically improve the signal-to-noise ratio (SNR), dynamic range, bandwidth, and spectrum reconstruction of a dFT spectrometer.

Some of these modifications can be applied to other Fourier-transform spectrometers, including hybrid systems where part of the optical function is performed using off-chip components coupled with the photonic chip, for instance, with optical fiber or free space optics coupled to on-chip waveguides and acting as a part of the optical path. In addition, shifting the interferometer spectrum allows this on-chip technology to be readily applied to radio-frequency (RF) spectrum analysis and Raman spectroscopy for chemical and biological detection.

We also disclose how to perform RF spectrum analysis over a very broad bandwidth (e.g., >1 THz) with high performance using a single low-cost photonic platform and the aforementioned modifications to the dFT spectrometer. This RF spectrum analyzer can be made using commercially available photonics fabrication processes and integrates on a single chip the lasers, optical amplifiers, phase modulators, passive components, and detectors for performing RF spectrum analysis from frequencies as low as 100 MHz and bandwidths equal to or greater than 1 THz.

An example spectrometer may include a beam splitter, a phase modulator in optical communication with the beam splitter, at least one amplitude modulator in optical communication with the beam splitter and/or the phase modulator, a detector in optical communication with the phase modulator and/or the amplitude modulator, and a processor operably coupled to the detector. In operation, the beam splitter splits incident light into a first portion and a second portion. The phase modulator modulates a relative phase between the first portion and the second portion such that interference of the first portion with the second portion creates a null at a desired frequency. The amplitude modulator, which can be implemented with one or more phase modulator(s), modulates an amplitude of at least one of the first portion or the second portion so as to reduce an intensity of the interference of first portion with the second portion at the desired frequency. The detector detects the interference of the first portion with the second portion. And the processor determines a spectrum of the incident light based on the interference of the first portion and the second portion, the spectrum having the null at the desired frequency.

The desired frequency of the null may be a center frequency of a pump beam used to illuminate a sample, in which case the incident light is emitted, scattered, reflected, and/or transmitted by the sample. The null's full-width half-maximum can be less than a spectral resolution of the spectrum.

The amplitude modulator can be configured to balance an amplitude of the first portion with an amplitude of the second portion, e.g., to increase the fringe visibility. The detector can make a plurality of interferogram measurements between the first portion and the second portion with a null at the desired frequency in each interferogram measurement in the plurality of interferogram measurements.

The spectrometer may also include first and second interference arms, each in optical communication with the beam splitter. The first interference arm includes an optical switch, a first waveguide and first and second waveguides in optical communication with first and second outputs, respectively, of the optical switch. The first waveguide guides the first portion along a first optical path length. And the second waveguide guides the first portion along a second optical path length different than the first optical path length. The second interference arm receives the second portion of the incident light.

The optical switch can be an analog optical switch that couples a first percentage of the first portion into the first waveguide while coupling a second percentage part of the portion into the second waveguide. The optical switch may include a double Mach-Zehnder interferometer configured to compensate for at least one imperfection in at least one component of the optical switch. There may also be a tap, in optical communication with the first interference arm, to couple a fraction of the first portion out of the first interference arm. This tap can be coupled to a switch monitor photodetector that monitors an intensity of the fraction of the first portion.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

The on-chip digital Fourier transform spectrometers disclosed here can be easily scaled to ultra-high spectral channel count (e.g., >1024 channels) for absorption-based sensing, Raman spectroscopy, dense-wavelength division multiplexing (DWDM) monitoring, and radio frequency (RF) spectrum analysis (to name just a few applications). The basic architecture of this spectrometer (detailed in U.S. Pat. No. 10,006,809 B2, which is incorporated herein by reference) includes a Mach-Zehnder interferometer, where on each arm light is directed to paths of varying lengths via optical switches. For each optical switch, light can be directed into one of two paths (as detailed in U.S. Pat. No. 10,006,809 B2) or a partial combination of the two paths (described below). In the first case where light is directed into one of two paths (a binary switch), the total number of measurable spectral channels is equal to $2^N$, where N is the total number of optical switches.

Figure 1:
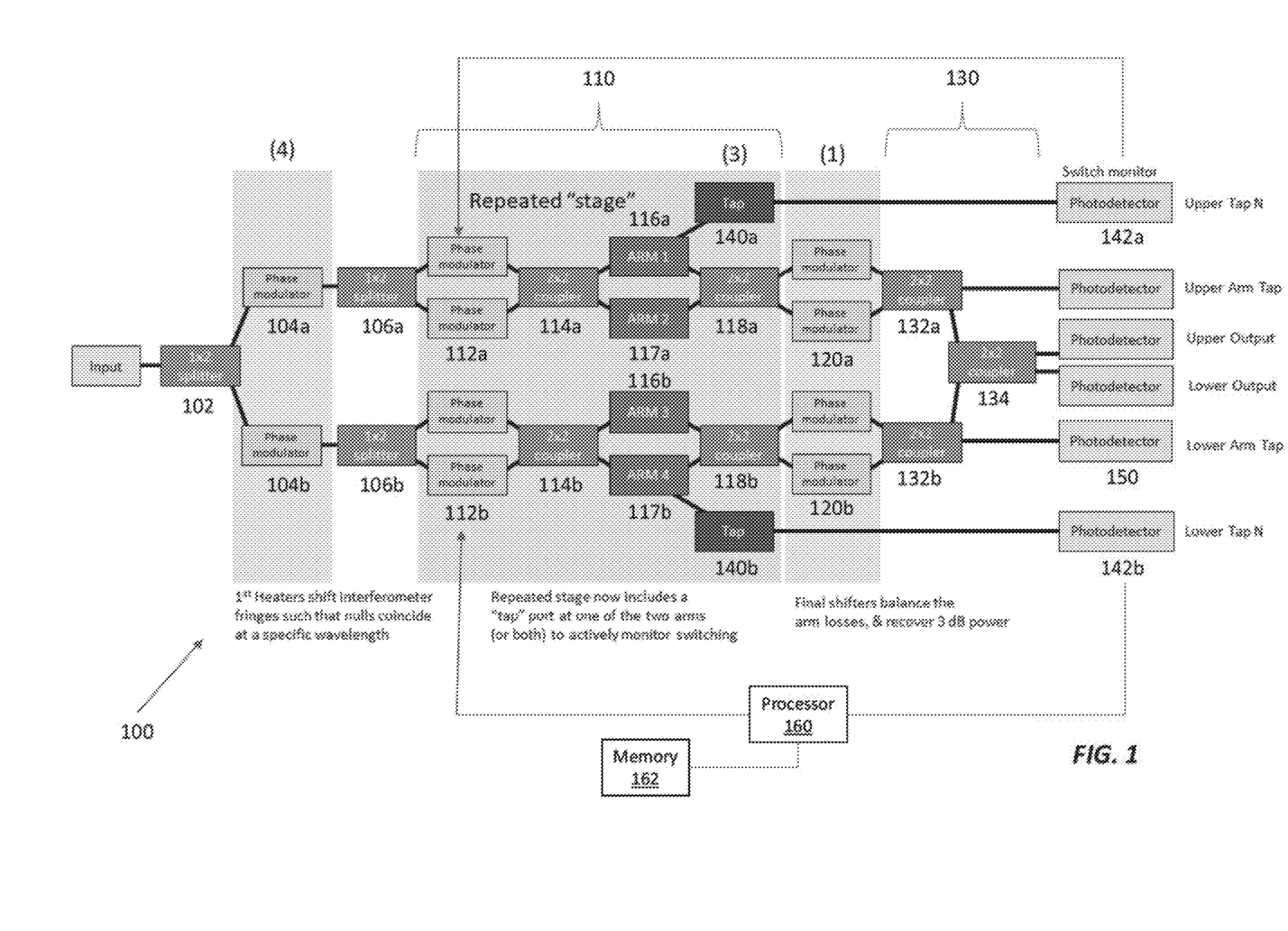
FIG. 1 is a block diagram of an inventive high-performance digital Fourier transform (dFT) spectrometer with input phase shifters for frequency nulling, taps and photodetectors for actively monitored switching, and output phase shifters for balancing and recovering power.

FIG. 1 shows a block schematic of an inventive high-performance digital Fourier transform (dFT) spectrometer 100. Like our original dFT spectrometer, this improved dFT spectrometer 100 includes an input splitter 102 that couples an input beam into two parallel paths. Each path has one or more binary delay stages 110 arranged in series (FIG. 1 shows only one stage 110 per path for clarity). Each binary delay stage 110 has two arms, shown in FIG. 1 as upper and lower arms, with a broadband switch at the input to each arm. In FIG. 1, each switch is implemented as a 1×2 coupler 106a, 106b whose outputs are coupled to respective phase modulators 112a, 112b, which in turn are coupled to inputs of respective 2×2 couplers 114a, 114b (collectively, phase modulators 114). Adjusting the relative phases of the inputs to the 2×2 couplers 114 varies the output power distribution at the outputs of the 2×2 splitters 114. By choosing the relative phase appropriately (e.g., 0 or π for perfect components), it is possible to switch an input light completely from one output to the other output. (Each switch can be implemented with a single phase modulator but using two phase modulators per switch enables less phase modulation per phase modulator (e.g., π/2 per phase modulator for net π phase shift) for more precise phase modulation than using a single phase modulator.)

Each broadband switch couples light into an upper arm 116a, 116b and/or into a lower arm 117a, 117b whose optical path length is different than that of the corresponding upper arm 116a, 116b. Each broadband switch may couple all of the light into one arm or the other, as in our original dFT spectrometer, or it may couple some light into each arm, which we refer to as "partial switching" and describe in greater detail below. In either case, output couplers 118a, 118b couple light from the upper arms 116a, 116b and lower arms 117a, 117b to a beam-combining stage 130, which has cascaded 2×2 couplers 132a, 132b, and 134 that combine the outputs for detection by one or more photodetectors 150.

The light from the different arms interferes at the photodetectors 150, which are coupled to a processor 160. The measured interference pattern depends on the spectrum of the input beam and the path length difference(s) between and within each path through the dFT spectrometer 100. The processor 160 actuates the switches in the delay stages 110 based on settings stored in a memory 162. Actuating the switches changes the path length difference(s), making it possible to make interference measurements at many possible path length differences. The number of possible path length differences equals the number of measurable spectral channels. The processor 160 determines the spectrum based on these interference measurements by the photodetectors 150. The processor 160 also monitors and controls the tap monitor photodetectors, input phase modulator, output phase modulators, and switches described below using settings stored in the memory 162.

The dFT spectrometer 100 includes several additional features that improve its performance and give it new capabilities. To start, it has a phase modulator 104a, 104b (collectively, input phase modulators 104) at the input to each path through the dFT spectrometer 100 for narrowband filtering. These phase modulators 104 can be implemented as thermo-optic heaters that change the optical path length distance by heating a section of waveguide. The dFT spectrometer 100 can include two phase modulators 104—one in each path—as in FIG. 1 or a single input phase modulator 104 in one path and can placed at the path input(s) as in FIG. 1 or at the path output(s) (e.g., between couplers 132a, 132b and 134).

In either case, the input phase modulator(s) 104 introduce a relative phase shift that can be selected to produce a null in the detected interference spectrum. The center wavelength of this null depends on the relative phase shift and can be selected to selectively filter light at certain frequencies. For instance, it can be used to suppress interference at the wavelength of a strong signal, such as a Raman pump beam, that might otherwise dominate the spectrum measured by the spectrometer. This narrowband filtering is discussed in greater detail below.

In addition to in-line input phase modulators 104 for narrowband filtering, the dFT spectrometer includes taps 140a, 140b (collectively, taps 140) in each delay stage 110 for monitoring the switching efficiency. Each tap 140a, 140b couples a small fraction (e.g., 1% or less) of the beam propagating through one arm of the delay stage 110 to a corresponding photodetector 142a, 142b, which measures the tapped optical power. This measurement can be used to determine if the broadband switches are set correctly and to adjust the switch settings by change the relative phase differences imparted by the phase modulators 112a, 112b.

The dFT spectrometer 100 also includes a final amplitude modulation stage, implemented here with output phase modulators 120a and 120b (collectively, output phase modulators 120) coupled between the outputs of the output couplers 118a, 118b and the first set of 2×2 couplers 132a, 132b in the beam-combining stage 130. These output phase modulators 120a and 120b compensate for loss imbalances between the two arms by actively attenuating the optical signal as described in greater detail below.

(1) In-Line Phase Modulators for Narrowband Filtering

In many applications of optical spectroscopy, including Raman spectroscopy and RF spectrum analysis, there is a broadband signal to be measured and an undesired high-intensity, single-frequency signal (e.g., the Raman excitation light or the carrier signal in RF spectrum analysis). Noise that exists on the single-frequency signal is transferred to the rest of the optical spectrum in conventional Fourier transform spectrometers, dramatically deteriorating the reconstruction of smaller intensity signals. (This deterioration is known as the multiplex disadvantage or Fellgett's disadvantage.)

This single-frequency signal and its noise can be suppressed by tuning the spectrometer's transmission spectra so that a null in the interferogram (a single frequency at which the transmission is zero) is aligned with the single frequency at every interferogram measurement. The relative phase difference that produces this null can be set during calibration and tuned based on the desired center frequency of the null. The suppression produced by this relative phase difference can be used in any type of Fourier transform spectrometer, including dFT spectrometers. In the dFT spectrometer 100 of FIG. 1, this suppression is achieved with input phase modulators 104. Tuning these phase modulators 104 causes the dFT spectrometer 100 to perform spectroscopy simultaneously on a broad frequency band (the signals of interest) and efficiently filter a laser or single-frequency signal with an extinction ratio set by the intensity modulators 120 used for arm balancing (described below).

This technique can also be applied to any Fourier transform spectrometer, including benchtop free-space FT spectrometers. With this technique, a measurement of the interferogram is performed only when there is a null in the transmission spectra at $\lambda_0$ (the wavelength of light that is filtered), which occurs when:

$$\frac{2\pi n_g}{\lambda_0}\Delta L = \pi + a2\pi$$

where $\alpha$ is an integer, $\Delta L$ is the waveguide path length difference between the top and bottom interferometer arms, and $n_g$ is the group index experienced by the light propagating through (the arms of the spectrometer. (Other nulls may appear at wavelengths offset from $\lambda_0$ by the free spectral range.) The resulting null has a width that is less than the spectral resolution of the spectrometer. In RF spectrum analysis, this width is called the resolution bandwidth, which is the minimum separation required to visually separate adjacent peaks in the measured spectrum. In a heterodyne receiver, the resolution bandwidth is the bandwidth of the intermediate frequency (IF) filter at some level below the minimum insertion loss point (maximum deflection point on the display).

To achieve efficient filtering, back reflection and modal conversion (in particular polarization conversion from fundamental transverse electric (TE) to transverse magnetic (TM) mode or vice versa) should be suppressed too. This can be achieved by proper design of the splitters, couplers, and phase modulators. For example, adiabatic couplers represent one specific embodiment for the coupler and splitter design that suppress back reflection and modal conversion.

(2) Amplitude Modulation for Arm Balancing

After light passes through the delay stages 110 with variable waveguide lengths in the dFT spectrometer 100 in FIG. 1, light passes through a 2×2 final optical switch that both directs light to the final 2×2 beam splitter 134 (or equivalently a 2×1 combiner) and acts as an intensity modulator. This final 2×2 optical switch is implemented as the four parallel output phase shifters 120 and prevents 50% (3 dB) of the light from being lost to the upper arm tap 140a and lower arm tap 140b. The final 2×2 optical switch to the upper and lower photodetectors 150 (labelled "Upper Output" and "Lower Output").

In addition to decreasing the insertion loss across the spectrometer by 3 dB, the output phase modulators 120 can be individually addressed to tune the relative losses between the top and bottom interferometer paths. By balancing the losses in the paths, the extinction ratio (aka the visibility) of the interference fringes at the output of the dFT spectrometer 100 can be arbitrarily increased (limited only by the resolution of the phase modulators in this switch). Arbitrarily increasing the extinction ratio of the dFT spectrometer 100 enables a dramatic increase in the dynamic range of the reconstructed optical spectra and can be carried out dynamically, in real time, based on optical power measurements by the various photodetectors in the spectrometer.

Without being bound by any particular theory, this technique for increasing the fringe visibility can be described analytically as follows. To start, consider the transmittance of a 2×2 variable switch, which can be expressed as:

$$T = \frac{1}{4}|1 + e^{i\varphi}|^2$$
$$= \frac{1}{4}(1 + e^{i\varphi}) \cdot (1 + e^{i\varphi})^*$$
$$= \frac{1}{4}(1 + \cos\varphi + i\sin\varphi) \cdot (1 + \cos\varphi - i\sin\varphi)$$
$$= \frac{1}{4}(1 + \cos\varphi)^2 + \frac{1}{4}\sin^2\varphi$$

Here $\varphi$ is the relative phase delay between the arms of the 2×2 variable switch (not the paths in the dFT spectrometer 100). To ensure power balancing between the two paths of the dFT spectrometer 100, the 2×2 variable switch's transmittance is set to:

$$\frac{1}{4}(1 + \cos\varphi)^2 + \frac{1}{4}\sin^2\varphi = \frac{I_{low}}{I_{high}} = R$$

Here R is the starting power imbalance ratio of the two paths of the dFT spectrometer 100. This gives:

$$1 + \cos\varphi = 2R \Rightarrow$$

$$\varphi = \arccos(2R - 1)$$

This is the relative phase delay that should be imposed by the phase shifter. Now consider deviation from this ideal phase delay value due to a small drift/variation $\Delta\varphi$:

$$\frac{\partial T}{\partial \varphi} = \frac{\partial \left[\frac{1}{4}(1 + \cos\varphi)^2 + \frac{1}{4}\sin^2\varphi\right]}{\partial \varphi} = -\frac{\sin\varphi}{2}$$

With the phase inaccuracy, the transmittance becomes:

$$T' = R - \Delta\varphi \cdot \frac{\sin\varphi}{2} = R - \Delta\varphi \cdot \sqrt{R(1-R)}$$

given that $$\sin\varphi = \sqrt{1 - (2R-1)^2} = 2\sqrt{R(1-R)}.$$

The fringe visibility (extinction ratio) of the dFT spectrometer 100 is given by:

$$ER = 10\log_{10}\frac{(\sqrt{T'} + \sqrt{R})^2}{(\sqrt{T'} - \sqrt{R})^2} \approx 10\log_{10}\frac{4R}{(\sqrt{T'} - \sqrt{R})^2}$$
$$= 10\log_{10}\frac{4R}{(\sqrt{R - \Delta\varphi \cdot \sqrt{R(1-R)}} - \sqrt{R})^2}$$
$$= 10\log_{10}\frac{4}{\left(\sqrt{1 - \Delta\varphi \cdot \sqrt{\frac{1}{R} - 1}} - 1\right)^2}$$
$$= -10\log_{10}\left[\frac{1}{16}\left(\frac{1}{R} - 1\right)\Delta\varphi^2\right]$$

Here, we take the approximation that T'≈R. For an average 21 dB starting visibility and a phase variation of less than 0.05% (estimated based on experimental data from a 64-channel prototype), increasing the fringe visibility and nulling the excitation laser wavelength yields a rejection ratio in excess of 80 dB at the excitation laser wavelength.

Figure 2A:
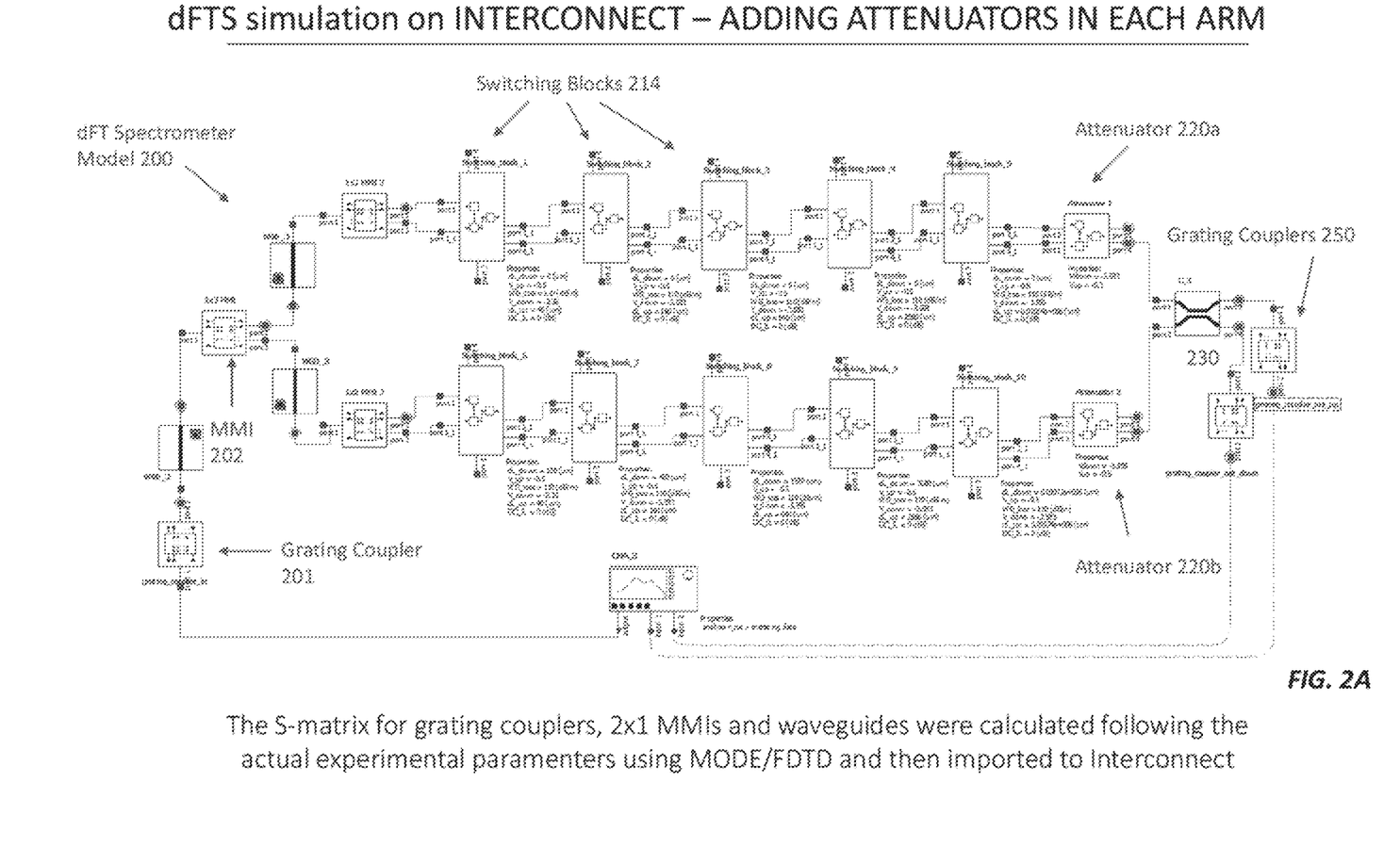
FIG. 2A is a model of a dFT spectrometer with attenuators in the output arms for simulating the effects of balancing the power loss in the output arms.

FIGS. 2A-2D illustrate simulated performance of a dFT spectrometer 200 with attenuators 220a and 220b (collectively, attenuators 220) for balancing the outputs of each spectrometer arm. As shown in FIG. 2A, the dFT spectrometer 200 has two arms which are fed by an input grating coupler 201 and broadband multi-mode interference (MMI) coupler 202. Each spectrometer arm has five cascaded switching blocks (delay stages) 214. Each switching block 214 can be actuated to provide a longer or shorter optical path length. One attenuator 220a is coupled to the output of the last switching block 214 in the upper spectrometer arm, and the other attenuator 220b is coupled to the output of the last switching block 214 in the lower spectrometer arm. The attenuators 220 feed a pair of grating couplers 250 via a final 2×2 switch 230.

Figure 2B:
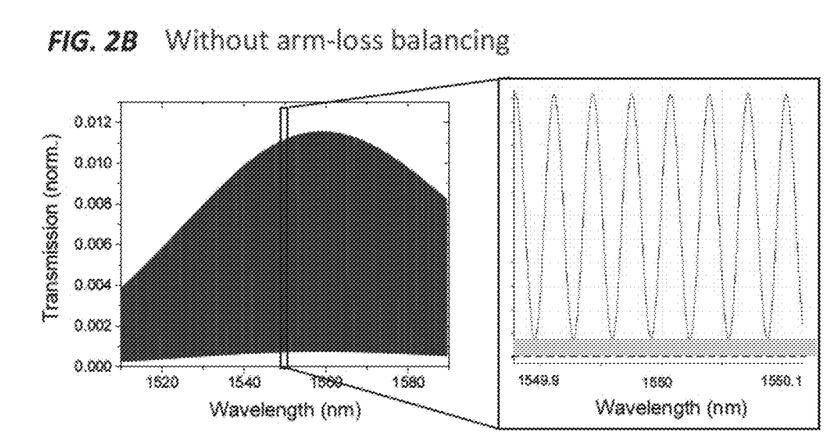
FIG. 2B is a simulated spectrum for the model of FIG. 4A without power-loss balancing.
Figure 2C:
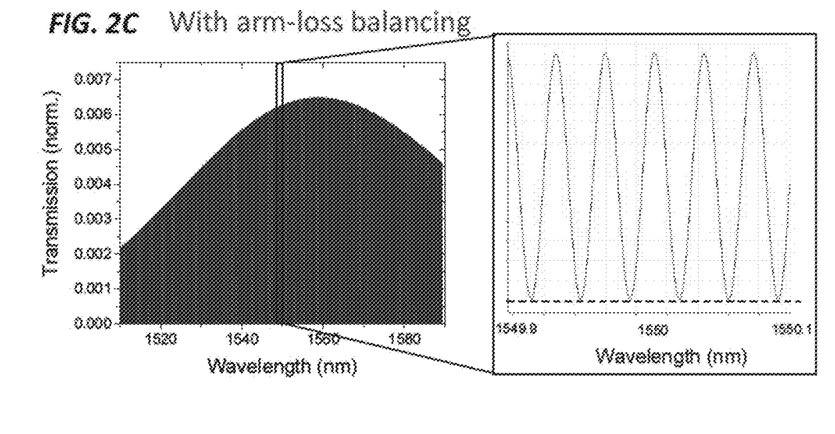
FIG. 2C is a simulated spectrum for the model of FIG. 4A with power-loss balancing.
Figure 2D:
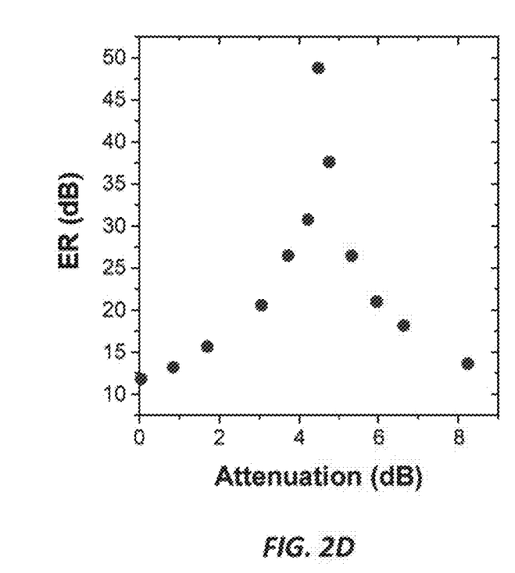
FIG. 2D is a plot of the simulated extinction ratio versus attenuation for the model of FIG. 2A.

FIGS. 2B and 2C illustrated simulated outputs for the dFT spectrometer 200 in FIG. 2A without and with arm-loss balancing, respectively. In FIG. 2B, without arm-loss balancing, the attenuators 220 do not attenuate the outputs of the spectrometer arms. In FIG. 2C, with arm-loss balancing, the attenuators 220 attenuate the outputs of the spectrometer arms but increase the fringe visibility by bringing the minimum intensity closer to zero (indicated by the horizontal dashed line in FIGS. 2B and 2C). FIG. 2D is a plot of the extinction ratio (ER) at a wavelength of 1550 nm versus attenuation and shows an ER increase of up to 40 dB for an attenuation of about 4 dB.

(3) Partial (Intermediate) Switching of Optical Switches

In our original spectrometer, each switch could be depicted as being a binary "UP" or "DOWN" switch state, which results in an exponential scaling law for possible path length combinations. (That is, for N 2×2 switches, there are $2^N$ possible path lengths through the dFT spectrometer.) But for a dFT spectrometer with N switches and $2^N$ spectral channels, it is often times desirable to acquire spectra with more than $2^N$ resolvable spectral channels. For example, a spectrometer with 3 stages (N=6, and 64 interferometer states), obtaining even higher resolution spectra (for example, 801 spectral channels) involves inverting a rectangular 64×801 matrix. Acquiring additional information about the input light makes it possible to make the calibration matrix squarer and improves the quality of the reconstructed spectrum.

One method of acquiring more information about the input light is by exploiting the continuous phase modulation of the optical switches in the dFT spectrometer 100 of FIG. 1. Partially switching an optical switch (i.e., setting the optical switch to an intermediate switching state) via voltage modulation causes some light to exit each of the optical switch's outputs in a power ratio set by the voltage modulation (intermediate switching state). This causes light to travel through both the top and bottom paths of the dFT interferometer 100 simultaneously as opposed to traveling through only the top arm or only the bottom arm as with binary switching. This results in the formation of interference fringes forming in the spectra of light in both top and bottom arms, and results in a unique transmission spectrum at the final output of the dFT spectrometer 100. In this way, each optical switch takes on an analog (rather than binary) value, making it possible to obtain an arbitrarily large number of dFT transmission spectra (and therefore dFT basis states). This greatly simplifies the spectrum reconstruction process, since the calibration matrix can be chosen to be square with a more complete set of basis vectors.

(4) dFT Switch Monitoring

FIG. 1 shows an additional improvement to the dFT interferometer architecture: either or both of the arms with predetermined physical path lengths (arms 116 and 117 in FIG. 1) may include an in-line tap 140 that sends a small fraction of light to a dedicated photodetector 142. (In FIG. 1, only arms 116a and 117b have taps.) This can be accomplished with an adiabatic directional coupler that passes most of the light straight through the arm and couples a small fraction (say, 1% or less) of the light to a corresponding "switch monitor" photodetector 142.

The taps 140 and switch monitor photodetectors 142 allow for real-time monitoring of the switches, so that each phase modulator 112 can accurately direct 100% of the light to either the top arm 116 or bottom arm 117. This is especially useful since a priori knowledge of the phase modulator setting required to completely switch the light between arms is difficult to determine beforehand (due to fabrication imperfections).

dFT switch monitoring also corrects for varying levels of thermal cross-talk between nearby switches at different dFT switch states. More specifically, a phase modulator 112 implemented as a thermo-optic phase modulator operates by heating a portion of a waveguide to increase the effective refractive index and retard the beam propagating through the waveguide. This heat may dissipate, leading to heating of adjacent waveguides controlled by other phase modulators 112. If the heating is significant enough, it may lead to an unintended or undesired phase shift of a beam modulated by an adjacent phase modulator—that is, thermal cross-talk between adjacent switches. Monitoring the actual switch states with the taps and switch monitor photodetectors makes it possible to compensate for thermal cross-talk by adjusting the phase modulator settings.

(5) Spectrally Segmented Modulation for Broadband Operation

Spectrally segmented modulation can be used for very broadband operation of a dFT spectrometer. Spectrally segmented modulation is similar in principle to the intermediate modulation scheme described above. In this technique, we increase or maximize the visibility of the interferometer fringes for each switch state but only for some finite bandwidth of operation. Then, we can iteratively increase or maximize the visibility of the interferometer for any arbitrary number of other bandwidths, so that we have a unique switch state (set of phase modulator voltages) for each desired band of operation. These additional "states" constitute additional rows and columns of a larger calibration matrix, described below, which can be used to reconstruct the initial spectrum vector from the measured interferogram at all of the switch states.

In practice, even perfect Mach-Zehnder optical switches have wavelength dependence related to wavelength dispersion and waveguide dispersion. For example, a thermo-optic Mach-Zehnder optical switch with heaters of length $L_{htr}$ perfectly switches light to one output when:

$$\phi = \frac{2\pi v}{c_0} \frac{\partial n_{\it{eff}}(\lambda)}{\partial T} \Delta T L_{htr} = \frac{\pi}{2} + n\pi,$$

where v is the frequency, $c_0$ is the speed of light in a vacuum, $\partial n_{\it{eff}}(\lambda)/\partial T$ is the wavelength-dependent dispersion, and $\Delta T$ is the temperature change that actuates the switch.

As a result, there exists some finite bandwidth $\Delta v_{switch}$ over which each Mach-Zehnder optical switch has sufficiently high extinction to make a high-fidelity spectral measurement with the dFT spectrometer. Within this spectral segment, the spectrometer basis vectors include cosines. Outside of this range, the Mach-Zehnder optical switch does not switch light perfectly, so the frequency response of the entire dFT spectrometer is dominated by interference from the many optical paths through the switches. This issue can be remedied by calibrating the phases on the Mach-Zehnder optical switches for each of m different, non-overlapping spectral segments, where $m = \Delta v / \Delta v_{switch}$. Each broadband spectrum measurement would include switching through all $m \times 2^N$ interferometer states. Calibration of the dFT spectrometer would take m times longer but would enable spectrum measurements spanning more than half an octave.

Figure 3A:
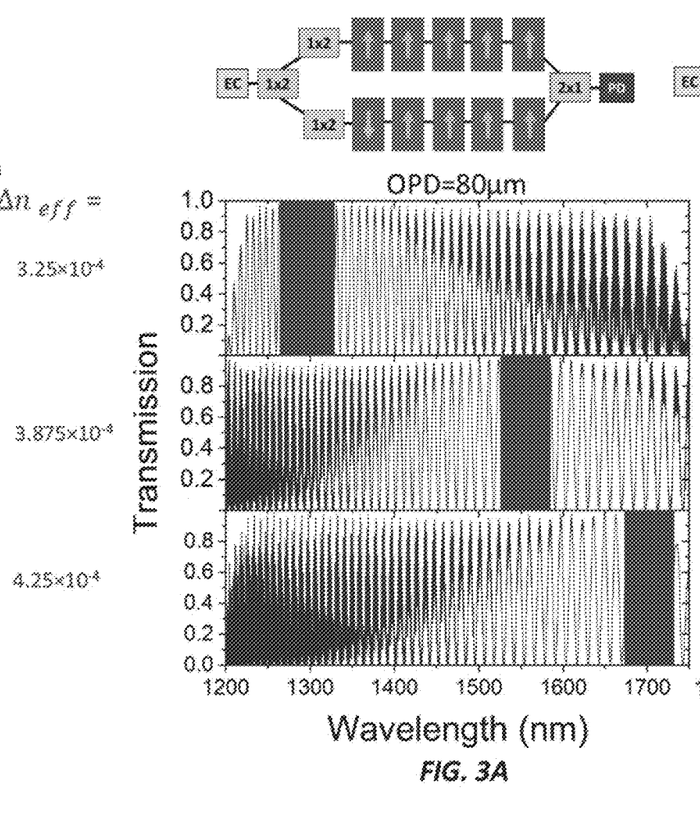
FIG. 3A shows simulated transmission spectra at effective refractive index differences of 0.0325 (upper plot), 0.03875 (middle plot), and 0.0425 (lower plot) for a 10-switch dFT spectrometer (top) actuated to provide an 80 μm optical path difference (OPD).
Figure 3B:
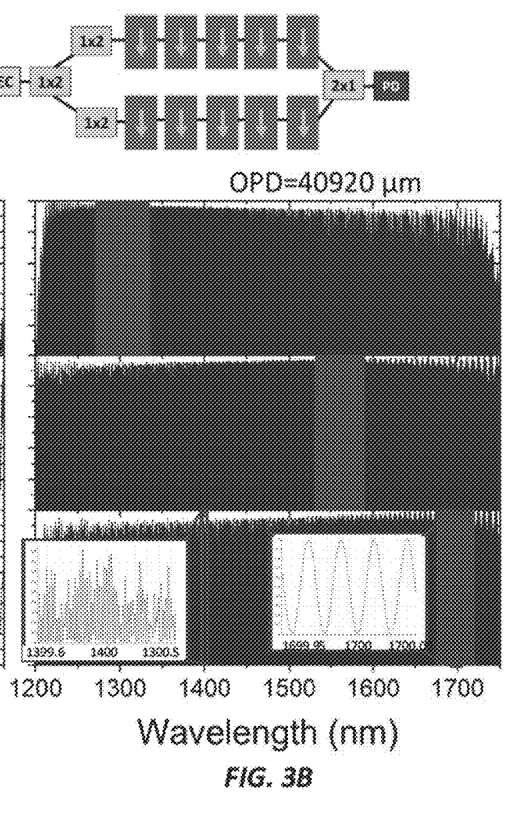
FIG. 3B shows simulated transmission spectra at effective refractive index differences of 0.0325 (upper plot), 0.03875 (middle plot), and 0.0425 (lower plot) for a 10-switch dFT spectrometer (top) actuated to provide a 40,920 μm optical path difference (OPD).

FIGS. 3A and 3B illustrate simulated spectra from a 10-switch (delay stage) dFT spectrometer where the switches are driven with spectrally segmented modulation. The top of each figure shows the dFT spectrometer and its switch state. In FIG. 3A, only one switch is actuated to produce a nominal optical path difference between the spectrometer arms of 80 µm; in FIG. 3B, all of the switches are actuated to produce a nominal optical path difference between the spectrometer arms of 40,920 µm. Thanks to wavelength dispersion and waveguide dispersion, the actual switch state varies with wavelength and temperature. To compensate for dispersion, the heaters in the switches can be set to higher or lower temperatures, resulting in slight changes in the effective refractive index and hence different switching ratios for the switches over different spectral segments. These switch settings and switching ratios can be set empirically to maximize the fringe visibility over a particular wavelength range (spectral segment). In FIGS. 3A and 3B, for instance, increasing the effective refractive index, which is equivalent to increasing the temperature of the thermo-optic heater in each switch, increases the center wavelength of the spectral segment with the highest fringe visibility.

(6) Broadband Optical Components

Broadband operation of a dFT spectrometer can be properly engineered using low-loss, broadband optical couplers (for example, adiabatic asymmetric directional couplers), broadband fiber-to-chip coupling techniques (such as inverse taper couplers), and broadband 1×2 power splitters and combiners.

Figures 4A, 4D:
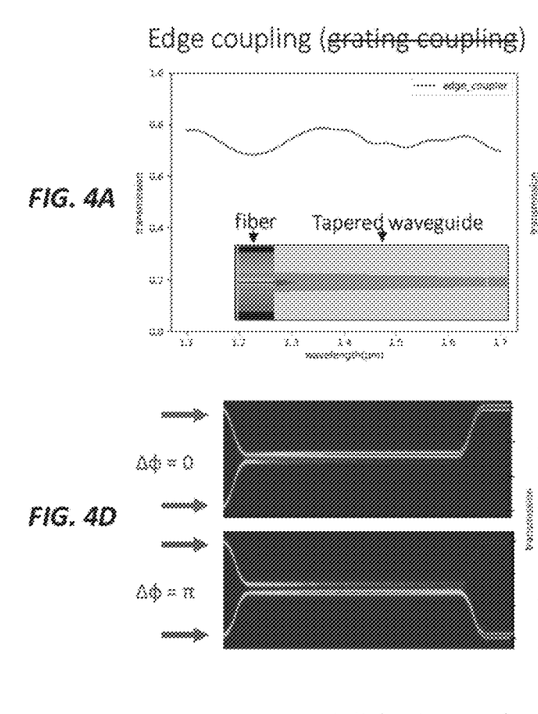
FIG. 4A is a plot of simulated transmission versus wavelength for edge coupling light from an optical fiber to a tapered waveguide in a dFT spectrometer.
FIG. 4D is a plot of simulated beam-propagation in a 2×2 adiabatic coupler at the output of the optical switch in FIG. 4C for phase-matched inputs (top) and inputs with a 7 phase difference (bottom).
Figures 4B, 4E:
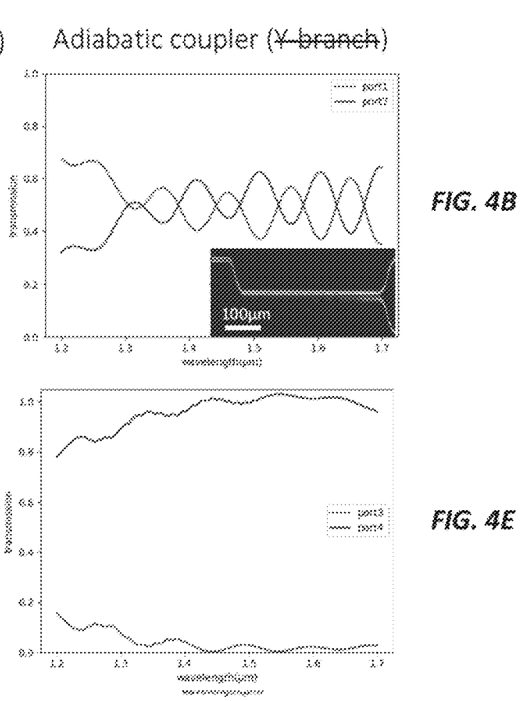
FIG. 4B is a plot of simulated transmission versus wavelength for adiabatically coupling between adjacent waveguides in a dFT spectrometer.
FIG. 4E is a plot of simulated transmission versus wavelength for upper port (upper trace) and lower port (lower trace) in the 2×2 adiabatic coupler of FIGS. 4C and 4D.

FIGS. 4A-4E illustrate simulated behavior of different broadband optical components suitable for use in a dFT spectrometer. FIG. 4A is a plot of coupling efficiency versus wavelength over 600 nm wavelength range for edge coupling between an optical fiber and a tapered waveguide (inset). The coupling efficiency is relatively constant over the entire range, unlike a grating coupler, which typically has high coupling efficiency over a narrower wavelength range. FIG. 4B is a plot of power versus wavelength for a 1×2 adiabatic splitter (inset), where each trace represents a different output. Again, the power levels are relatively constant over a 600 nm wavelength range.

Figure 4C:
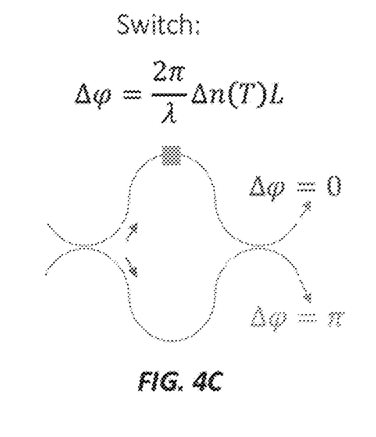
FIG. 4C illustrates operation of a broadband 2×2 Mach-Zehnder optical switch with an output 2×2 adiabatic coupler.

FIG. 4C shows a broadband 2×2 switch with input and output 2×2 adiabatic couplers forming a Mach-Zehnder interferometer. The switch in FIG. 4C has a single phase shifter but could have a phase shifter in each arm. FIGS. 4D and 4E illustrate operation of a 2×2 adiabatic coupler (e.g., the output 2×2 adiabatic coupler in FIG. 4C) for inputs with the same relative phase (top plot, FIG. 4D; top trace, FIG. 4E) and a relative phase difference of $\pi$ (bottom plot, FIG. 4C; bottom trace, FIG. 4D). Again, the outputs are relatively constant for a 500 nm bandwidth for both input phase conditions.

(7) Perfect Optical Switching

Traditional optical switches use a Mach-Zehnder interferometer (MZI) with a phase shifting element and two waveguide directional couplers that are assumed to have a perfect power splitting ratio, e.g., as in FIG. 4E. In practice, fabrication imperfections make it difficult to achieve true 50:50 splitting using waveguide directional couplers, so the optical switches tend to be imperfect. For optical switches in a dFT spectrometer, this imperfect switching results in light leakage onto undesired waveguide paths and problematic multi-path interference effects.

To address this problem, we implement a double Mach-Zehnder interferometer configuration like the one disclosed in D. A. B. Miller, "Perfect optics with imperfect components," *Optica*, 2, 8 (2015), pp. 747-750, which is incorporated herein by reference in its entirety. Adding phase shifting elements before and after a typical MZI provides sufficient degrees of freedom to compensate for imperfect power splitting in each coupler and achieve near-perfect optical switching. This approach has been demonstrated to yield up to 60.5 dB interferometer visibility in silicon photonic interferometers. Furthermore, with a power monitor on one of the two arms that samples a small fraction of light (such as 1% as shown in FIG. 1), it is straightforward to calibrate these optical switch blocks with a beam-splitter 50:50 setup process. In addition, the phase shifters before and after may also include a tunable material (such as a phase change material, polymer cladding, laser-trimmable waveguide, etc.) that can be tuned once to enable perfect optical switching.

Figure 5:
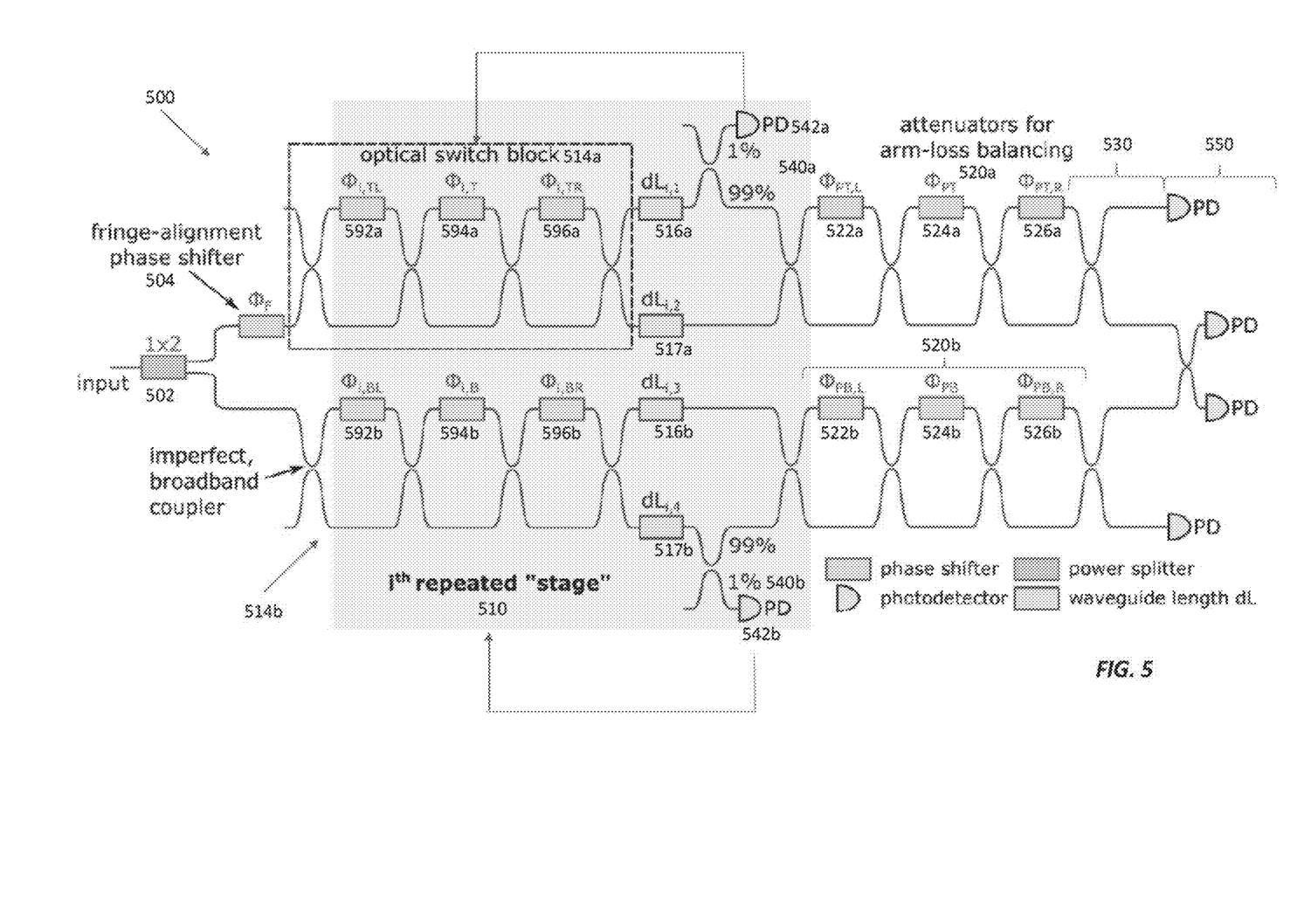
FIG. 5 is a block diagram of an inventive high-performance dFT spectrometer with input phase shifters for frequency nulling, taps and photodetectors for actively monitored switching, output phase shifters for balancing and recovering power, broadband couplers with imperfect power splitting ratios, and extra phase shifters for "perfect optical switching."

FIG. 5 shows a dFT spectrometer 500 with "perfect" optical switch blocks 514a and 514b in delay stages 510 fed by a 1×2 input coupler with a fringe-alignment (nulling) phase shifter 504 coupled to one output. (Only one set of delay stages 510 is shown for clarity.) Each block 514a (514b), has three cascaded, imperfect directional couplers with nominal 50:50 splitting ratios. A phase shifter 594a (594b) between the first and second directional couplers controls the nominal coupling ratio at the output of the optical switch block 514a (514b). A phase shifter 592a (592b) before the first directional coupler and another phase shifter 596a (596b) between the second and third directional couplers compensates for deviations in the coupling ratios of the directional couplers from their nominal coupling ratios.

Each optical switch block 514a (514b) couples light between a first optical path length 516a (516b) and a second optical path length 517a (517b). The optical path lengths are different to produce different interference patterns for different switch settings at the spectrometer output. A tap monitor photodetector 542a (542b) in each arm detects the power level coupled out of one optical path length 516a (517b) and uses the detected power to actuate the corresponding optical switch block 514a (514b). The settings for the phase shifters in the switch block 514a (514b) can be set by fully minimizing or maximizing the power on the corresponding tap monitor photodetector 542a (542b).

The outputs of the last delay stage are coupled into respective attenuators/intensity modulators 520a, 520b for load balancing. Like the optical switch blocks 514, each attenuator 520a (520b) includes three cascaded directional couplers with a first phase shifter 522a (522b) before the first directional coupler, a second phase shifter 524a (524b) between the first and second directional couplers, and a third phase shifter 526a (526b) between the second and third directional couplers. The second phase shifter 524a (524b) sets the nominal output power levels and the other phase shifters compensate for deviations in the coupling ratios of the directional couplers from their nominal coupling ratios. A coupling tree 530 couples the load-balancing modulators' outputs to photodetectors 550 for generating the interferogram measurements.

Using broadband optical components makes it possible to produce perfect optical switching across a sufficiently large bandwidth for typical applications. Broadband inverse taper edge couplers like those in FIG. 4A and broadband asymmetric directional couplers with >160 nm bandwidth like those in FIGS. 4B-4D can dramatically increase the spectral bandwidth of dFT spectrometers.

(8) Performing Radio-Frequency (RF) Spectrum Analysis dFT spectroscopy can be used for performing radio-frequency (RF) spectrum analysis on a single mass-manufacturable photonic chip, which does not require coupling of light to/from the chip during regular operation. (Coupling light to and from the photonic chip is traditionally a costly and time-consuming step in photonic chip production.) This device may comprise a single III/V compound semiconductor chip (such as an indium phosphide chip), which further comprises integrated lasers, semiconductor optical amplifiers (SOAs), passive components, phase modulators, and photodetectors. Electrical contacts for controlling the phase modulators, lasers, SOAs, and photodetectors are used to interface with the chip during normal operation.

Figure 6A:
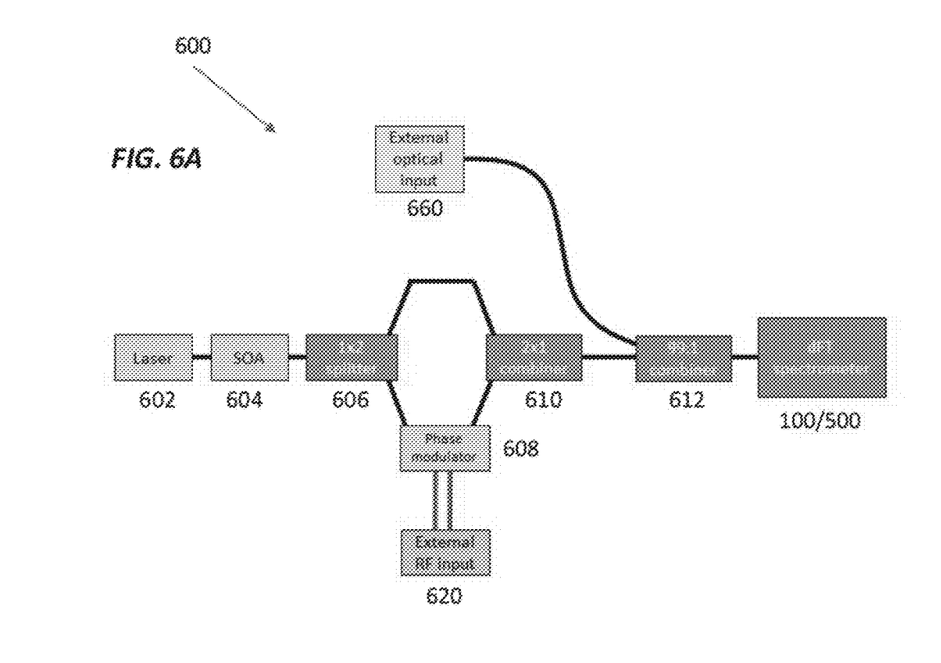
FIGS. 6A and 6B shows radio-frequency (RF) spectrum analyzers using dFT spectrometers.
Figure 6B:
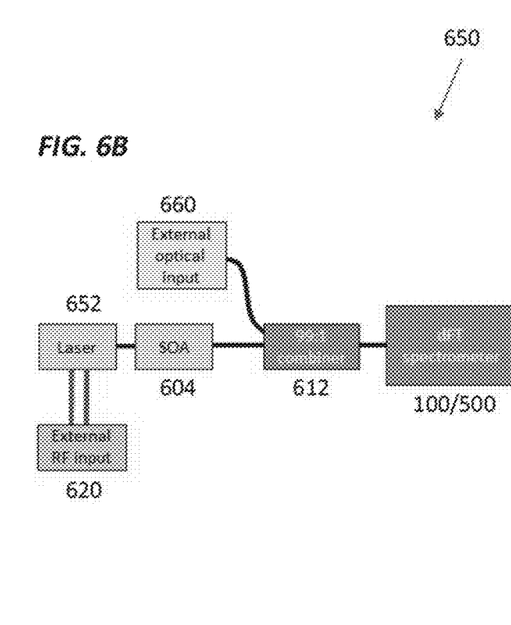

FIGS. 6A and 6B show complete on-chip RF spectrum analyzers 600 and 650, respectively, that can leverage a III-V compound semiconductor platform to fabricate all the optical components on a single photonic chip. In FIG. 3A, the beam from a carrier laser 602 is amplified by an SOA 604 and coupled into a Mach-Zehnder interferometer formed by a pair of 1×2 couplers 606, 610. An external RF signal source 620 directly modulates the phase of one arm of the Mach-Zehnder interferometer via a phase modulator 608, thereby modulating the intensity of the carrier laser beam. In FIG. 3B, the external RF signal source 660 can be used to directly modulate the power of a carrier laser 652. In both cases, the RF-modulated carrier laser beam is coupled via 99:1 combiner 612 into a dFT spectrometer 100/500 as shown in FIG. 1 or 5 or in U.S. Pat. No. 10,006,809 B2.

The 2×1 optical coupler 612 allows light from an external light source 660 to be coupled to the dFT spectrometer 100/500 for initial calibration and tuning, e.g., as detailed below. The calibration can be performed once after manufacturing of the photonic chip. External optical input is not part of the system and is not used unless re-calibration is desired. Once light passes through the dFT spectrometer 100/500 and the signal is read by integrated on-chip photodetectors, the data is collected by a separate electronics unit that performs spectrum reconstruction.

The electronics (not shown) for the RF spectrum analyzer photonic integrated circuits shown in FIGS. 6A and 6B include:

(1) Controllers for the phase modulators in the dFT spectrometer 100/500 (including digital-to-analog (D/A) converters, power amplifiers, and optionally on-board digital logic);
(2) A dedicated current amplifier circuit (transimpedance amplifier) for each integrated photodetector;
(3) Power electronics for driving the laser and semiconductor optical amplifier;
(4) An RF signal input 620 that connects to either the phase modulator 608 (FIG. 6A), laser 652 (FIG. 6B), or other modulator and is impedance matched to the input transmission line (to reduce reflections); and
(5) Thermo-electric cooling/heating (TEC) elements and associated thermistors (for feedback) integrated nearby the photonic circuit to hold the temperature of the chip constant.

(7) dFT Tuning Process

TABLE 1 outlines a tuning process for controlling the phase modulators in a high-performance dFT spectrometer like the ones shown in FIGS. 1 and 5:

TABLE 1

| Step # | For each of the $2^N$ binary switch states, do the following: |
|---|---|
| 1 | For each of the phase modulators 112 in the N optical switches, minimize (or maximize, depending on the desired switch state) the power at the corresponding tap photodetector (e.g., "Upper Tap 142a" or "Lower Tap 142b" in FIG. 1). |
| 2 | Tune the final phase modulators 120 so that the photodetector powers at "Upper Arm Tap" and "Lower Arm Tap" photodetectors 150 (FIG. 1) are minimized. |
| 3 | Input a single frequency light source (at the desired frequency to be filtered) in the dFT spectrometer, and then tune the input phase modulator(s) 104 so that the power at the final output photodetector(s) 150 ("Upper Output" and "Lower Output" in FIG. 1) is minimized. |
| 4 | (Optional) Re-tune the output phase modulators 120 so that for an input frequency identical to Step 3 the final output photodetector(s) signals are minimized. Optionally, return to step 3 if the final photodetector(s) power is not below a pre-set threshold. |
| 5 | Save the determined phase modulator powers, voltages, or currents as a look-up table in dedicated memory 162 (FIG. 1) for use in actuating the switches in the dFT spectrometer 100. |

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of operating a spectrometer, the method comprising:
    splitting incident light into a first portion and a second portion;
    transmitting the first portion through at least one delay stage switchable between a first waveguide having a first optical path length and a second waveguide have a second optical path length different than the first optical path length;
    transmitting the second portion through a reference waveguide;
    attenuating at least one of the first portion or the second portion to compensate for loss imbalance between the at least one delay stage and the reference waveguide;
    detecting interference between the first portion with the second portion; and
    determining a spectrum of the incident light based on the interference of the first portion and the second portion,
    wherein attenuating the first portion comprises modulating a relative phase between the first portion and the second portion such that the interference of the first portion with the second portion has a null at a desired frequency.

2. The method of claim 1, wherein transmitting the first portion through the at least one delay stage comprises transmitting the first portion through a plurality of cascaded delay stages.

3. The method of claim 1, wherein transmitting the first portion through the at least one delay stage comprises transmitting a first fraction of the first portion through the first waveguide and a second fraction of the first portion through the second waveguide.

4. The method of claim 1, wherein transmitting the first portion through the at least one delay stage comprises transmitting the first portion through the first waveguide and further comprising:
    switching the at least one delay stage from the first waveguide to the second waveguide; and
    transmitting the first portion along the second waveguide.

5. The method of claim 1, wherein attenuating the first portion increases an extinction ratio of the interference between the first portion and the second portion.

6. The method of claim 1, further comprising, before detecting the interference:
    coupling a fraction of the first portion out of the at least one delay stage;
    detecting an intensity of the fraction of the first portion; and
    adjusting a setting of the at least one delay stage based on the intensity.

7. A spectrometer comprising:
    a beam splitter to split incident light into a first portion and a second portion;
    a delay stage, in optical communication with a first output of the beam splitter and switchable between a first waveguide having a first optical path length and a second waveguide have a second optical path length different than the first optical path length, to delay the first portion with respect to the second portion;
    a reference waveguide, in optical communication with a second output of the beam splitter, to guide the second portion;
    an attenuator, in optical communication with at least one of the delay stage and the reference waveguide, to attenuate at least one of the first portion or the second portion;

a detector, in optical communication, via the attenuator, with the delay stage and the reference waveguide, to detect interference of the first portion with the second portion;

a processor, operably coupled to the detector, to determine a spectrum of the incident light based on the interference of the first portion and the second portion;

a tap, in optical communication with the delay stage, to couple a fraction of the first portion out of the delay stage; and a monitor photodetector, in optical communication with the tap, to monitor an intensity of the fraction of the first portion.

8. The spectrometer of claim 7, wherein the delay stage is a first delay stage and further comprising:

a second delay stage, concatenated with the first delay stage and switchable between a third waveguide having a third optical path length and a fourth waveguide having a fourth optical path length different than the third optical path length, to further delay the first portion with respect to the second portion.

9. The spectrometer of claim 7, wherein the delay stage is configured to guide a first fraction of the first portion through the first waveguide and, simultaneously, to guide a second fraction of the first portion through the second waveguide.

10. The spectrometer of claim 7, wherein the delay stage is configured to be switched between a first state in which the first portion propagates through the first waveguide and a second state in which the first portion propagates through the second waveguide.

11. The spectrometer of claim 7, wherein the attenuator is configured to increase an extinction ratio of the interference between the first portion and the second portion.

12. The spectrometer of claim 7, wherein the attenuator is configured to adjust a relative phase between the first portion and the second portion.

13. The spectrometer of claim 7, further comprising:

a phase modulator, in optical communication with the beam splitter, to modulate a relative phase between the first portion and the second portion such that interference of the first portion with the second portion creates a null at a desired frequency.

14. A spectrometer comprising:

a beam splitter to split incident light into a first portion and a second portion;

a delay stage, in optical communication with a first output of the beam splitter and switchable between a first waveguide having a first optical path length and a second waveguide have a second optical path length different than the first optical path length, to delay the first portion with respect to the second portion;

a reference waveguide, in optical communication with a second output of the beam splitter, to guide the second portion;

an attenuator, in optical communication with at least one of the delay stage and the reference waveguide, to attenuate at least one of the first portion or the second portion;

a detector, in optical communication, via the attenuator, with the delay stage and the reference waveguide, to detect interference of the first portion with the second portion;

a processor, operably coupled to the detector, to determine a spectrum of the incident light based on the interference of the first portion and the second portion; and a phase modulator, in optical communication with the beam splitter, to modulate a relative phase between the first portion and the second portion such that interference of the first portion with the second portion creates a null at a desired frequency.

15. The spectrometer of claim 14, wherein the delay stage is a first delay stage and further comprising:

a second delay stage, concatenated with the first delay stage and switchable between a third waveguide having a third optical path length and a fourth waveguide having a fourth optical path length different than the third optical path length, to further delay the first portion with respect to the second portion.

16. The spectrometer of claim 14, wherein the delay stage is configured to guide a first fraction of the first portion through the first waveguide and, simultaneously, to guide a second fraction of the first portion through the second waveguide.

17. The spectrometer of claim 14, wherein the delay stage is configured to be switched between a first state in which the first portion propagates through the first waveguide and a second state in which the first portion propagates through the second waveguide.

18. The spectrometer of claim 14, wherein the attenuator is configured to increase an extinction ratio of the interference between the first portion and the second portion.

* * * * *